United States Patent [19]

Lalaouna et al.

[11] Patent Number: 5,439,370

[45] Date of Patent: Aug. 8, 1995

[54] DEVICE FOR MOLDING PLASTIC MATERIAL FERRULE FOR OPTICAL FIBER CONNECTORS

[75] Inventors: Saïd Lalaouna; Jean-Francois Ollivier, both of La Ferte Bernard; Manuel Penha, Le Mans, all of France

[73] Assignee: Framatome Connectors International, Courbevoie, France

[21] Appl. No.: 199,631

[22] Filed: Feb. 22, 1994

Related U.S. Application Data

[62] Division of Ser. No. 103,031, Mar. 24, 1993, Pat. No. 5,313,541.

[30] Foreign Application Priority Data

Mar. 24, 1992 [FR] France ................... 92 03523

[51] Int. Cl.⁶ .................. B29C 45/34; B29C 45/36
[52] U.S. Cl. ....................... 425/546; 249/141; 249/144; 249/151; 425/468; 425/577; 425/812
[58] Field of Search ............. 249/142, 144, 151, 175, 249/141; 425/546, 577, 468, 812

[56] References Cited

U.S. PATENT DOCUMENTS 4,479,910 10/1984 Kurokawa et al. ............ 249/144
4,493,632 1/1985 Hori et al. ..................... 425/468
4,711,752 12/1987 Deacon et al. ................ 249/151
4,941,642 7/1990 Stoll et al. .................... 249/151
5,269,998 12/1993 Takagi et al. ................. 425/468

Primary Examiner—James P. Mackey
Attorney, Agent, or Firm—Pollock, Vande Sande & Priddy

[57] ABSTRACT

A device for molding plastics material ferrules for optical fiber connectors comprises a molding cavity defined by an accurately sized cylindrical bush defining the outside diameter of the ferrule. A cover closes the molding cavity. A peg joined to the cover extends axially into the molding cavity and is extended at its free end by an accurately sized needle defining the inside diameter of the ferrule. A backing member extending axially into the molding cavity from the opposite end as compared with the peg comprises a bore for guiding the needle adapted to receive the end thereof when the backing member moves towards the peg so as to render the needle and the bush concentric. A venting system allows gases to escape from the molding cavity to the exterior when plastics material is injected into the mold. The backing member is a substantially cylindrical body of revolution which fits directly into the bush with no clearance and minimal force.

4 Claims, 1 Drawing Sheet

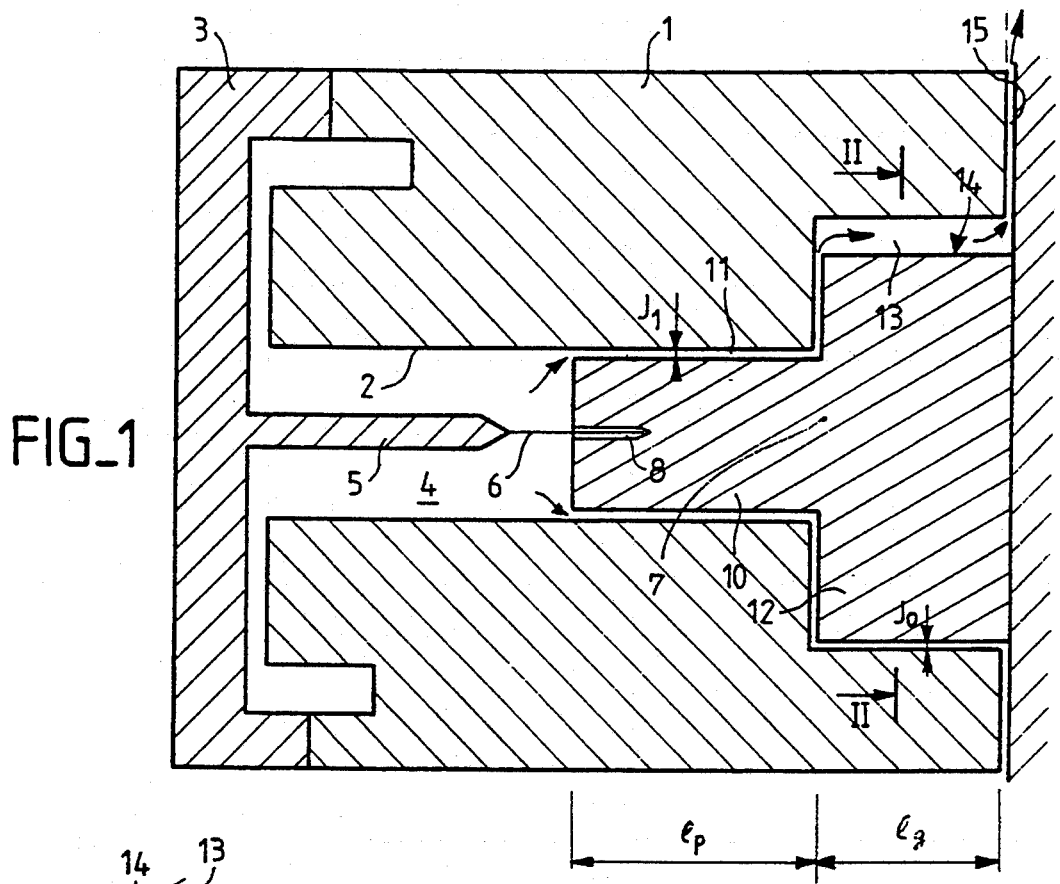
FIG_1
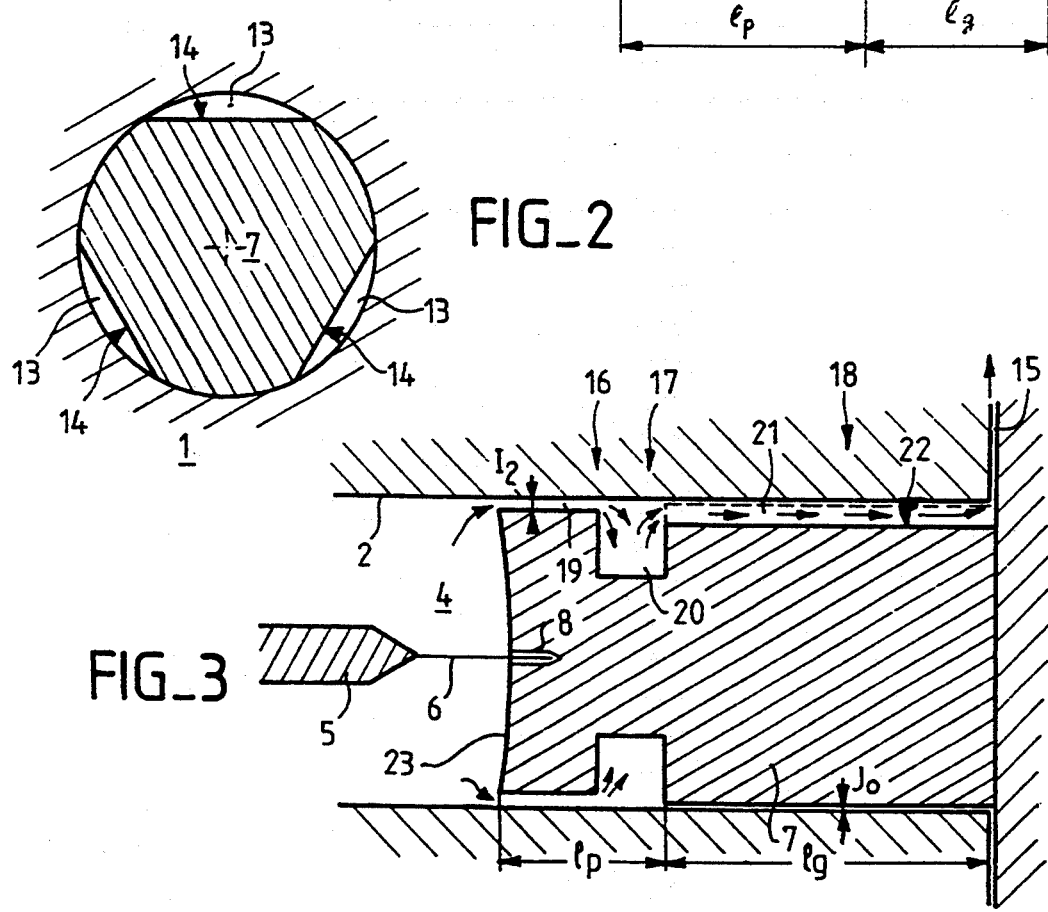
FIG_2
FIG_3

DEVICE FOR MOLDING PLASTIC MATERIAL FERRULE FOR OPTICAL FIBER CONNECTORS

This is a divisional of application Ser. No. 08/103,031, filed Mar. 24, 1993, now U.S. Pat. No. 5,313,541.

BACKGROUND OF THE INVENTION

1. Field of the Invention

The invention concerns the process of molding plastic material ferrules for optical fiber connectors.

Ceramic ferrules can be machined very accurately but, are costly, while plastics material ferrules, although much less costly, are often mediocre in terms of dimensional accuracy.

2. Description of the Prior Art

Conventional techniques for molding plastic materials (both thermoplastic and thermosetting materials) are rarely able to achieve the necessary accuracy: a typical ferrule is cylindrical, 12 mm long with an outside diameter of 2 500 μm and an axial bore with a diameter of 127 μm; both diameters must be accurate to within (0, +1 μm) and the maximum permissible offset between the centers of the inside and outside diameters is 0.7 μm.

The mold therefore comprises a hollow cylindrical member (sometimes called a "precision bush") which is accurately machined and which receives an axial peg carrying at its end an accurately sized pin with a diameter of 126 μm (0, −1 μm). The bush and the needle can be made very accurately, but there remains the problem of making them concentric to within better than 0.7 μm. Because of molding constraints, the peg carrying the needle is joined to the cover of the mold, and it is therefore not possible to fasten the needle and the bush together as they have to be separated during each molding cycle. This makes it more difficult to achieve the required concentricity.

To overcome this problem, it has previously been proposed to use a "backing member" which is a tight fit in the bush and which has a 127 μm diameter bore which receives the needle and positions it accurately when the mold is closed and during injection of the plastic material (guide function).

However, a drawback of this backing member is that it impedes the evacuation of the gases contained in the molding cavity during injection (vent function). Given the constraints associated with molding bushes, venting via the mold closing plane in the usual way is not possible. Also, the clearance between the 126 μm needle and the 127 μm bore in the backing member is insufficient to provide a vent because the head loss in any such interstice would be much too large, in particular as the residual gases must be removed in a very short time period, the injection of the plastic material taking only a few seconds (in some instances less than two seconds).

For reasons to be explained hereinbelow, techniques of this type previously proposed do not constitute an entirely satisfactory solution with respect to venting and guidance. Until now it has not been possible to arrive at a compromise between large clearances or tolerance build-up which are detrimental to the accuracy of guidance and small clearances which prevent effective venting.

An object of the invention is to propose a backing member geometry which reconciles the requirements of the guide and vent functions and makes it possible to achieve the required concentricity of the inside and outside diameters of the molded ferrules.

SUMMARY OF THE INVENTION

This backing member is part of a molding device of the aforementioned type comprising: a molding cavity defined by an accurately sized cylindrical bush defining the outside diameter of the ferrule and a cover closing the molding cavity, a peg joined to the cover, extending axially into the molding cavity and extended at its free end by an accurately sized needle defining the inside diameter of the ferrule, a backing member extending axially into the molding cavity from the opposite end as compared with the peg and comprising a bore for guiding the needle adapted to receive the end thereof so as to render the needle and the bush concentric, and vent means for allowing gases to escape from the molding cavity to the exterior when plastics material is injected into the mold.

In accordance with a first embodiment of the invention, the vent means comprise the following axial succession of regions of the backing member: a short cylindrical vent region whose diameter is such that there exists between the backing member and the bush a clearance forming a continuous peripheral vent in communication with the molding cavity, a groove providing a flow regulation chamber and a long cylindrical guide region which fits in the bush with no clearance and minimal force, the backing member having discrete longitudinal vents extending along generatrices of the long cylindrical region.

In accordance with a second embodiment of the invention, the backing member is a substantially cylindrical body of revolution mounted directly in the bush of the molding cavity in which it fits with no clearance and minimal force. In this case, the inside diameter of the bush is preferably accurate to within (0, −1 μm) and the outside diameter of the backing member is accurate to within (+1 μm, 0), for a nominal diameter of 2 500 μm, the backing member being advantageously machined from a ceramic material.

The front surface of the backing member is very advantageously shaped as a template so as to impart to the corresponding surface of the ferrule a predetermined final shape which is the direct result of the molding operation.

The invention is also directed to a new product comprising an optical fiber connector ferrule having a non-machined front surface having a predetermined shape which is the direct result of the molding operation carried out using a molding device having this lastmentioned feature.

The invention will now be described in more detail with reference to the appended drawing.

BRIEF DESCRIPTION OF THE DRAWINGS

FIG. 1 is a schematic view in cross-section of a molding device using a prior art geometry backing member.

FIG. 2 is a view in cross-section on the line II—II in FIG. 1.

FIG. 3 corresponds to part of FIG. 1 for a backing member in accordance with the invention.

DETAILED DESCRIPTION OF THE INVENTION

A prior art device will be described first with reference to FIGS. 1 and 2.

In these figures, the mold body 1 comprises a central bore defined by a "precision bush" 2 which is closed by a cover 3. Conventional means are employed for injecting the plastic material, cooling the mold, opening the mold, etc.

This combination defines a molding cavity 4 inside which is disposed a peg 5 attached to the cover 3 and carrying at its free end an accurately sized needle 6 having a diameter of 126 μm. The inside diameter of the bush 2 defines the outside diameter of the ferrule to be molded (2 500 μm) and the diameter of the needle 6 defines the inside diameter of the bore in the ferrule (126 μm).

To hold the needle 6 accurately in place during molding in order to ensure that the needle and the bore 2 are concentric, a backing member 7 is inserted into the bush 2 and comprises a bore 8 with a diameter of 127 μm receiving the needle 6. The peg 5 attached to the cover 3 moves with the latter when the mold is closed (a travel of approximately 200 mm), which inserts the needle into the backing member 7, and when the mold is opened to remove the ferrule from the mold.

The backing member 7 has an anterior part 10 inserted in the bush 2 with a clearance $J_1$ forming an interstice 11 enabling gas to be discharged from the molding cavity 4 when plastic material is injected into it. The posterior part 12 of the backing member is accommodated in a similar cavity with the smallest possible clearance $J_0$, preferably no clearance at all, to guide the backing member 7 accurately. To enable the gas discharged via the interstice 11 to escape, the posterior part 12 comprises a number of passages 13 defined by flats 14 formed on it (see FIG. 2) so as to maintain the accurate guidance while leaving a passage for the gases. There are three flats disposed at 120° to each other, for example. The gases are evacuated via the mold closing plane 15 in the posterior part of the mold (the path of the discharged gases is shown by the arrows in FIG. 1). It can be seen that, although this prior art configuration solves the venting problem, it does not achieve very accurate guidance of the backing member 7 relative to the needle 6 and therefore is unable to assure accurate concentricity between the needle 6 and the bush 2: the guided length $l_g$ which is short relative to the cantilevered (unguided) length $l_p$ combined with the two bore diameters of the bush 2 and the two diameters of the backing member 7 result in tolerance build-up between the needle 6 and the bore 8, whereby the various dimensional inaccuracies are compounded. To alleviate this drawback, the invention proposes a new backing member structure, shown schematically in FIG. 3.

The backing member 7 in accordance with the invention comprises a cylindrical body of revolution which is entirely inserted into the bush 2 and comprises three successive regions 16, 17, 18. It may advantageously be machined from a ceramic material. The region 16 facing the peg 5 and the needle 6 is a short cylindrical region with a clearance $I_2$ of a few micrometers in the bore 2 so that it forms a homogeneous circular vent 19 communicating with the cavity 4. The second region 17 comprises a cylindrical groove 20 providing a flow regulation chamber. The third region 18 is a long cylindrical region which fits in the bush with minimal force, no clearance and no deformation, for example with an outside diameter of the backing member accurate to within (+1 μm, 0) for a nominal diameter of the bore 2 of 2 500 μm accurate to within (0, −1 μm). This region 18 of the backing member further comprises localized vents 21 formed by flats 22 of the same type as those described previously with reference to FIG. 2, to enable gases to escape from the flow regulation chamber 20 to the mold closing planes.

Note that each region of the part 7 has a specific function for which it is optimized:

the region 16 has a vent function, forming a narrow vent (to prevent plastic material from escaping) which is short (so as not to compromise the guide function) and which is circular so that the gases are evacuated in a homogeneous manner which does not disturb the filling of the molding cavity with the plastic material;

because of the groove 20, the region 17 functions as a flow regulation chamber and provides a transition between the continuous vent 19 and the localized vents 21, reducing the gas evacuation pressure, regularizing the gas flow and therefore neutralizing the effects of heterogeneous exhaust through the localized vents (it should be noted that the dimensions of the groove 20 are not particularly critical);

the region 18 has a guide function, with a minimal cantilever length (the ratio $l_p/l_g$ between the unguided and guided lengths is very much less than that of the prior art configuration, as can be seen by comparing FIGS. 1 and 3) and with minimal tolerance build-up because the member 7 is inserted directly into the bush 2.

In practice this produces a clearance of 0.5 μm between the peg 5 and the needle 6, on the one hand, and the bore 8 of the backing member 7, on the other hand. This is entirely compatible with the required concentricity tolerance of 0.7 μm and without any impediment to the proper evacuation of the gases. Furthermore, in addition to its vent and guide functions, the backing member 7 can fulfil a third or template function through causing the shape of the front surface 23 to impart a particular molded shape to the ferrule, for example a convex, plane, plane with rounded corners, inclined, etc. shape dependent on the required optical performance (which is known to be influenced by the shape of the front surface) and on the connector to which the ferrule is to be fitted.

There is claimed:

1. Device for molding a plastic ferrule for optical fiber connectors, said device comprising
   (a) a molding cavity defined by a cylindrical bush of a size defining an outside diameter of a said ferrule and a cover closing said molding cavity;
   (b) a peg joined to said cover, extending axially into said molding cavity and having a free end extended by a needle of a size defining an inside diameter of said ferrule;
   (c) a backing member extending axially into said molding cavity from an end of said molding cavity remote from said peg and comprising a bore for guiding said needle, said bore being adapted to receive a free end of said needle when said backing member moves towards said peg so as to render said needle and said bush concentric, said backing member being a substantially cylindrical body of revolution adapted to fit directly into said cavity of said bush with substantially zero clearance and substantially zero force; and
   (d) vent means for allowing gases to escape from said molding cavity to the exterior when plastic material is injected into said molding cavity.

2. Device according to claim 1, wherein the inside diameter of said bush has a tolerance of (0, −1 μm) and the outside diameter of said backing member has a tolerance of (+1 μm, 0) for a diameter of a nominal size of 2500 μm.

3. Device according to claim 1, wherein said backing member is machined from a ceramic material.

4. Device according to claim 1 wherein said backing member has a front surface adapted to impart to a respective surface of said ferrule a predetermined final shape which is a direct result of a molding operation.

* * * * *